US005523650A

United States Patent [19]
Terheijden et al.

[11] Patent Number: 5,523,650
[45] Date of Patent: Jun. 4, 1996

[54] ELECTRIC INCANDESCENT LAMP WITH A QUARTZ GLASS LAMP VESSEL AND QUARTZ GLASS TUBE FOR SAID LAMP

[75] Inventors: Joannes Terheijden, Eindhoven, Netherlands; Peter E. M. Van Den Eijn-Den, Lommel, Belgium

[73] Assignee: U.S. Philips Corporation, New York, N.Y.

[21] Appl. No.: 302,134

[22] Filed: Sep. 7, 1994

[30] Foreign Application Priority Data

Sep. 1, 1993 [EP] European Pat. Off. ............... 93202554

[51] Int. Cl.$^6$ ...................................... H01K 1/32
[52] U.S. Cl. .......................... 313/578; 313/636; 313/493
[58] Field of Search ...................................... 313/578, 573, 313/634, 636, 112, 493; 220/21 R; 501/54, 59, 62, 64, 66, 68, 152, 153, 154

[56] References Cited

U.S. PATENT DOCUMENTS

| | | | |
|---|---|---|---|
| 3,258,631 | 1/1963 | Elmer et al. | 313/112 |
| 4,501,799 | 2/1985 | Drissen et al. | 313/636 X |
| 4,749,902 | 6/1988 | Weiss | 313/636 X |
| 4,910,431 | 3/1990 | Witt et al. | 313/636 X |

FOREIGN PATENT DOCUMENTS

| | | | |
|---|---|---|---|
| 0032763 | 1/1981 | European Pat. Off. | C03C 3/06 |
| 1036726 | 7/1966 | United Kingdom | C03C 3/06 |
| 2176587 | 12/1986 | United Kingdom | F21V 9/00 |

OTHER PUBLICATIONS

Rpohkorova et al., "Effect of a third component and the conditions of synthesis on the spectral–luminescence properties of vitreous silica containing rare–earth elements", Soviet Journal of Glass Physics & Chemistry, vol. 13, No. 4, Jul. 1987, New York, pp. 292–297.

*Primary Examiner*—Sandra L. O'Shea
*Assistant Examiner*—Ashok Patel
*Attorney, Agent, or Firm*—Brian J. Wieghaus

[57] ABSTRACT

The electric incandescent lamp has a quartz glass lamp vessel (1) or envelope (4') around the lamp vessel, which has a red coloured dope in the area at the side of the incandescent body (3). The quartz glass with red dope contains samarium$^{II}$ oxide, aluminium oxide and silicon dioxide, the analysis of the glass in its oxidised form being $Sm_2O_3$ to 1 to 3% by weight, $Al_2O_3$ up to 3% by weight, rest $SiO_2$, the molar ratio Al/Sm being at least 2.

6 Claims, 2 Drawing Sheets

ELECTRIC INCANDESCENT LAMP WITH A QUARTZ GLASS LAMP VESSEL AND QUARTZ GLASS TUBE FOR SAID LAMP

BACKGROUND OF THE INVENTION

The invention relates to an electric incandescent lamp with a tubular quartz glass lamp vessel having an axis, in which lamp vessel an incandescent body is axially arranged and is laterally surrounded by quartz glass with a red dope. The invention also relates to a quartz glass tube with a red dope suitable for this electric incandescent lamp.

Such an incandescent lamp is known from U.S. Pat. No. 3,258,631.

The known lamp has a lamp vessel which, laterally of the incandescent body, comprises a dope which colors the lamp vessel red, and which is colorless around the portions beyond the incandescent body.

The manufacture of the lamp vessel starts with a tube of porous glass of high $SiO_2$ content which is impregnated between its ends at the outer surface with a solution of salts, for example, of iron, nickel and aluminium salts, and which is thermally treated in order to convert the salts into oxides and eliminate the pores. The manufacture of the glass tubing for the lamp vessel is very elaborate and therefore expensive.

GB 2,176,587-A discloses an electric incandescent lamp whose incandescent body is laterally surrounded by quartz glass with a red dope in that the lamp vessel is accommodated in a tube of that glass. In this lamp, the tube is coupled to the lamp by being enclosed between the lamp caps of the lamp so as to form a unit. Alternatively, the tube may be a separate body. It is a disadvantage of lamps having an enveloping tube that the lamp vessel can only be linear because bending of concentric tubes and providing a bent tube around another bent tube are either not possible at all or not possible on an industrial scale.

A red quartz glass tube is clamped around the lamp vessel by means of resilient members in other commercially available lamps. Alternatively, a red quartz glass tube may be loosely arranged around the lamp vessel, not as a body coupled to the lamp.

Lamps of the kind described may be used for heating purposes, for example, for room heating, preparation of food such as cooking, or as a heat source in industrial processes such as drying or curing of ink or paint. It is the purpose of the red quartz glass to prevent that the light generated by the lamp is radiated with an unpleasant intensity.

GB 1,036,726 discloses glass compositions of quartz glass with a dope of at least a compound of one of the metals having atomic numbers 22 to 29, 60, 62, 68, 74 and 92, with the possible addition of an aluminium compound. The composition is manufactured from the components by fusion at 1600°–2200° C., in air if purified sand is the basic material, in a vacuum of less than 666 Pa if quartz powder is the basic material.

SUMMARY OF THE INVENTION

It is an object of the invention to provide an electric lamp of the kind described in the opening paragraph, and a quartz glass tube with a red dope for such a lamp, which are easy to manufacture.

According to the invention, this object is achieved in that the quartz glass with the red dope comprises samarium$^{II}$ oxide, aluminium oxide and silicon dioxide, and upon analysis in oxidized form is found to contain, apart from oxides of trace elements, 1–3% by weight $Sm_2O_3$, up to 3% by weight $Al_2O_3$, while the remainder is $SiO_2$, the molar ratio Al/Sm being at least 2.

The quartz glass with the red dope has an orange-red to dark red color and is easily manufactured from the batch at a temperature of, for example, approximately 2000° C., and can be given a tubular shape by usual techniques. At $Sm_2O_3$ contents below 1% by weight, the glass has a too weak red color and transmits too much light for practical applications, whereas at contents above 3% by weight, the $Sm_2O_3$ dissolves in the quartz glass with insufficient homogeneity for practical applications and reduces the $SiO_2$ content of the glass too much.

In spite of its color, a tube made of the glass can be processed, for example, for providing a vacuumtight seal therein. A stronger heat source must be used for this, however, than for a corresponding tube of colourless quartz glass because the red quartz glass radiates much heat. Those skilled in the art, however, may readily ascertain the configuration of heat sources required for a given tube and process, such as bending, inflating, upsetting, and blowing out, in a few experiments.

Trace elements which may be present as impurities may be sodium and potassium, each up to a quantity of several ppm by weight, and iron up to a few tenths of ppm by weight.

The cited GB 1,036,726 mentions in Example 15 a quartz glass with 0.3% $Sm_2O_3$ by weight, 0.1% $Al_2O_3$ by weight, and the remainder $SiO_2$, prepared from quartz sand in vacuo or from purified sand in air. A brownish-orange quartz glass is obtained under these conditions. Samarium retains its preferred trivalent form. Samarium can be convened from its trivalent form $Sm^{III}$ into its bivalent form $Sm^{II}$ only with difficulty.

Surprisingly, however, this can be realised to a sufficient degree when a small quantity of reducing agent is added to the batch and the melt is made under hydrogen. It is favourable to add metallic silicon, for example, in a quantity of up to approximately 0.1% by weight, to the batch as a reducing agent because no foreign compound is introduced into the glass thereby. Once embedded in the glass, $Sm^I$ is sufficiently protected from oxidation. The aluminium oxide in the glass ensures a sufficient solubility of samarium in the quartz glass lattice. Samarium is badly dissolved in the glass at a molar Al/Sm ratio below 2, whereas the $SiO_2$ content of the glass has become too low for many applications at molar ratios in which the $Al_2O_3$ content is above 3% by weight.

The presence of $Sm^{II}$ becomes apparent in the color of the quartz glass and in the transmission spectrum thereof. Because of its sensitivity to oxidation, however, it is difficult to determine the $Sm^{II}$ content of the glass besides any $Sm^{III}$ analytically.

BRIEF DESCRIPTION OF THE DRAWINGS

Embodiments of the electric incandescent lamp according to the invention are shown in the drawing, in which.

DESCRIPTION OF THE PREFERRED EMBODIMENTS

Figure 1:
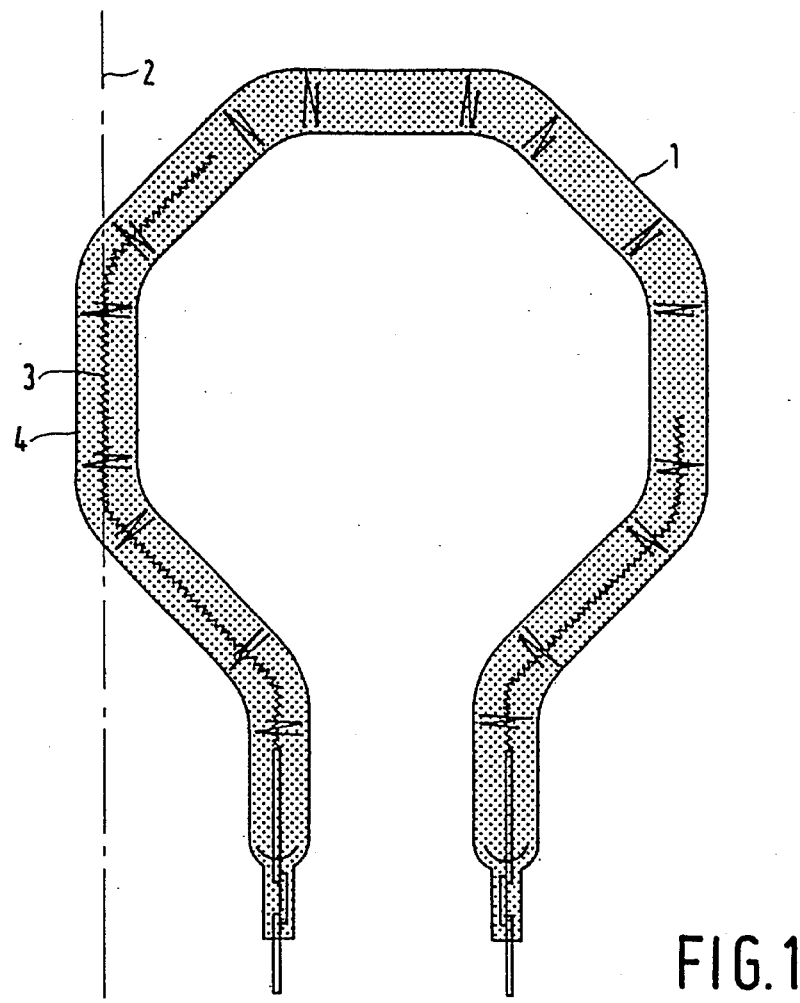
FIG. 1 is a side elevation of a first embodiment.

In FIG. 1, the electric incandescent lamp has a tubular quartz glass lamp vessel 1 with an axis 2. An incandescent body 3 is axially arranged therein. The incandescent body is laterally surrounded by quartz glass with a red dope.

The quartz glass 4 with the red dope comprises samarium$^{II}$ oxide, aluminium oxide and silicon dioxide, and comprises upon analysis in oxidized form 1–3% $Sm_2O_3$ by weight, up to 3% $Al_2O_3$ by weight, and the remainder $SiO_2$, besides oxides of trace elements, while the molar ratio Al/Sm is at least 2.

The lamp shown is particularly suitable for use as a cooking lamp. The quartz glass with the red dope of which the lamp vessel is made comprises upon analysis in oxidized form, apart from trace elements, 1.1% $Al_2O_3$ by weight, 1.1% $Sm_2O_3$ by weight, and for the rest $SiO_2$.

Figure 2:
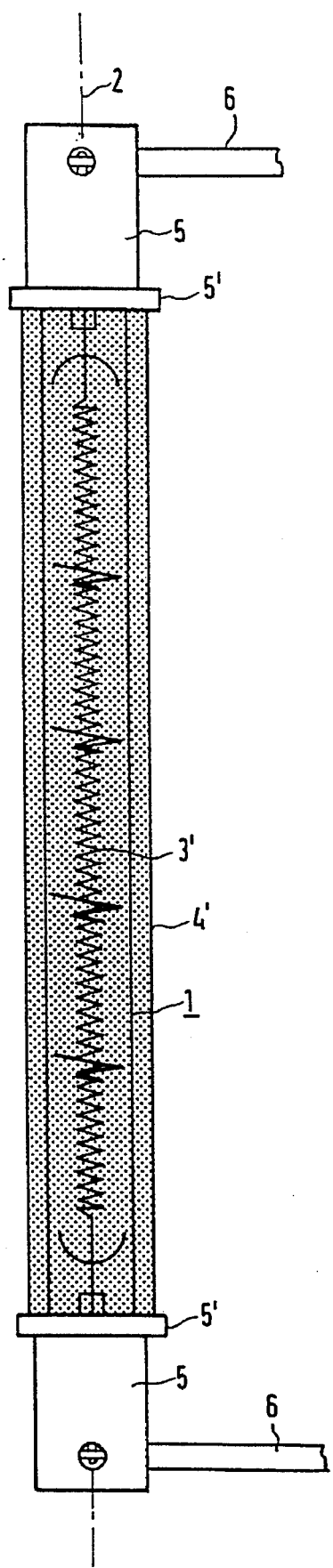
FIG. 2 is a side elevation of a second embodiment.

The lamp of FIG. 2 has a lamp vessel 1' of colourless quartz glass provided with a lamp cap 5 at either end. The lamp vessel is surrounded by a quartz glass tube 4' which is held fixed in position by the lamp caps 5. The lamp caps each have a collar 5' for this purpose. Cables 6 issue from the lamp caps to the exterior for connection of the lamp to a supply source at a distance. The quartz glass tube is found to contain upon analysis in oxidized form, apart from trace elements, 2.2% $Al_2O_3$ by weight, 2.2% $Sm_2O_3$ by weight, and for the rest $SiO_2$. The lamp may be used, for example, for room heating.

Figure 3:
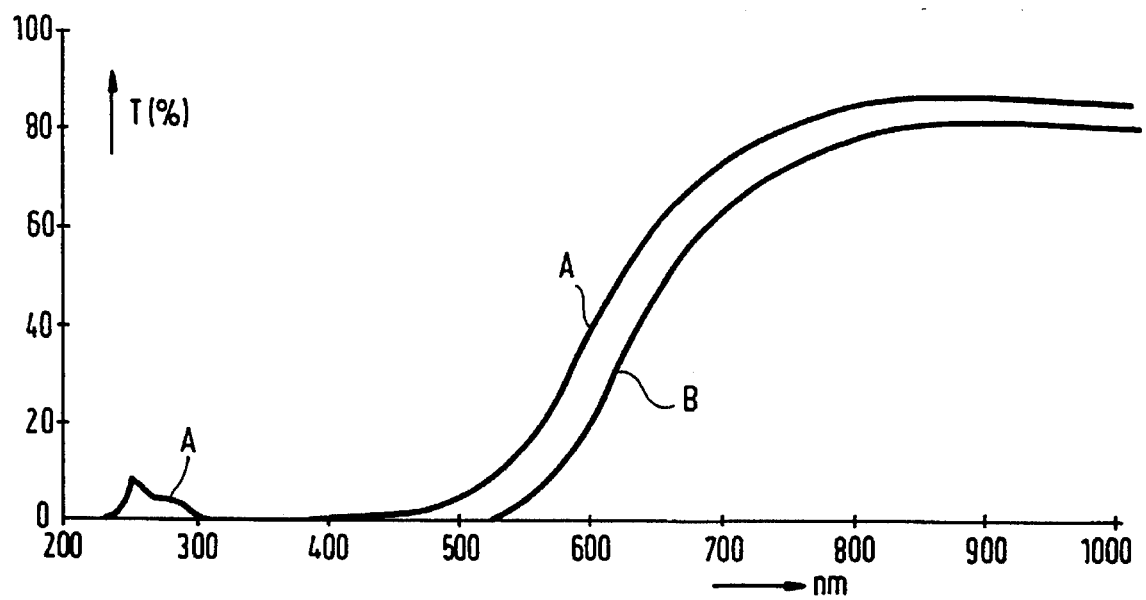
FIG. 3 shows the transmission spectra of the red quartz glasses from FIGS. 1 and 2.

In FIG. 3, curve A is the transmission curve of the red glass of FIG. 1 and curve B that of the red glass of FIG. 2.

We claim:

1. An electric incandescent lamp, comprising: a tubular quartz glass lamp vessel having a longitudinal axis, an incandescent body axially arranged in said lamp vessel, said incandescent body being laterally surrounded by quartz glass with a red dope comprising samarium$^{II}$ oxide, aluminium oxide and silicon dioxide, and upon analysis in oxidized form is found to contain, apart from oxides of trace elements, 1–3% by weight $Sm_2O_3$, up to 3% by weight $Al_2O_3$, while the remainder is $SiO_2$, the molar ratio Al/Sm being at least 2.

2. An electric incandescent lamp as claimed in claim 1, characterized in that the quartz glass lamp vessel comprises said quartz glass with the red dope.

3. An electric lamp, comprising:
   a light source; and
   a body of red-doped quartz glass surrounding at least a portion of said light-source,
   said red doped quartz glass comprising samarium$^{II}$ oxide, aluminium oxide and silicon dioxide, said red doped quartz glass containing in oxidized form 1–3% by weight $Sm_2O_3$ and up to 3% by weight $Al_2O_3$, excluding oxides of trace elements, while the remainder is $SiO_2$ and the molar ratio Al/Sm is at least 2.

4. An electric lamp according to claim 3, wherein said light source is an incandescent filament.

5. An electric lamp, comprising
   a lamp vessel having a portion of red doped quartz glass comprising samarium$^{II}$ oxide, aluminium oxide and silicon dioxide, said red doped quartz glass containing in oxidized form 1–3% by weight $Sm_2O_3$ and up to 3% by weight $Al_2O_3$, excluding oxides of trace elements, while the remainder is $SiO_2$ and the molar ratio Al/Sm being at least 2; and
   a light source arranged within said lamp envelope.

6. An electric lamp according to claim 5, wherein said light source is an incandescent filament.

* * * * *